3,075,990
PROCESS FOR MAKING N-SUBSTITUTED
THIAZOLESULFENAMIDES
John J. D'Amico, Charleston, W. Va., assignor to Monsanto Chemical Company, St. Louis, Mo., a corporation of Delaware
No Drawing. Filed Nov. 7, 1960, Ser. No. 67,502
10 Claims. (Cl. 260—306.6)

The present invention relates to the manufacture of N-substituted thiazolesulfenamides useful for accelerating vulcanization of rubber.

The usual method of making N-substituted thiazolesulfenamides is by oxidative condensation of mercaptothiazoles and amines. However, amines corresponding to the desired sulfenamides are not always available. Also, some amines react poorly by oxidative condensation. The present invention provides a route to sulfenamides which avoids use of amines, thereby leading to sulfenamides heretofore unknown or obtainable only in minute yield.

Thiazolesulfenamides unsubstituted on the nitrogen are satisfactorily produced from mercaptothiazoles and ammonia by oxidative condensation and are stable enough to use as intermediates. It is also known that unsubstituted thiazolesulfenamides condense with an aldehyde or ketone, as for example acetone, cyclohexanone, 2-allylcyclohexanone, 2-methylcyclohexanone, 4-methylcyclohexanone, cyclopentanone, methyl ethyl ketone, acetaldehyde, propionaldehyde, butyraldehyde, isobutyraldehyde, heptaldehyde, stearaldehyde, crotonaldehyde, acrolein, 2-methyl-2-pentenal, 2-ethyl-2-hexenal, hexahydrobenzaldehyde, cyclopentanecarboxaldehyde, alpha-furfuraldehyde, benzaldehyde, cinnimaldehyde, chloral, 2-thiophenaldehyde, 2,4-dichlorobenzaldehyde, 5-chlorosalicylaldehyde, o-chlorobenzaldehyde, 1-methyl-3-cyclohexenecarboxaldehyde and 3-cyclohexenecarboxaldehyde to yield unsaturated products. These unsaturated products which comprise the intermediates for the present process are of the type,

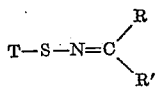

where T represent a thiazolyl radical and

represents the residue of the aldehyde or ketone. In the case of aldehydes R represents hydrogen and R' an organic substituent, as for example alkyl, alkenyl, aryl and halogenated derivatives thereof. Where the intermediate is derived from a ketone, both R and R' will be organic substituents. According to the present invention these unsaturated intermediates are reduced to the corresponding substituted thiazolesulfenamides. The products produced by this method are in general more stable than those produced by oxidative condensation.

Reduction under basic conditions is necessary for saturating the nitrogen-carbon double bond. Sodium borohydride is uniquely efficient for this reaction. It appears that T may be any 2-thiazolyl radical. These radicals comprise 5-membered heterocyclic groups composed of two vicinal carbon atoms and a third carbon atom in the 2-position between nitrogen and sulfur. The valences on the vicinal carbon atoms may be satisfied in any of a variety of ways well known in this art. The vicinal carbon atoms may be part of an aromatic ring such as benzene or naphthalene which in turn may be substituted or may constitute an isolated carbon carbon double bond, the remaining valences of which are satisfied by hydrogen or organic radical. As typical examples of thiazolyl radicals there may be mentioned 4-ethylbenzothiazolyl, 7-methyl-, 4-methyl-, 5-methyl- and 6-methylbenzothiazolyl, 4-methyl-5-chloro- and 4-methyl-6-chlorobenzothiazolyl, 4-chloro- and 6-chlorobenzothiazolyl, 6-phenyl and 4-phenylbenzothiazolyl, tetrahydrobenzothiazolyl, 6,7-dihydro-4,5-benzobenzothiazolyl, 4,5-dimethylbenzothiazolyl, 4,6-dimethylbenzothiazolyl, 4-methoxybenzothiazolyl, 5-methoxybenzothiazolyl, 6-methoxybenzothiazolyl, 4-methoxy-6-chlorobenzothiazolyl, 4-ethoxybenzothiazolyl, 5-ethoxybenzothiazolyl, 4,6-dimethyl-7-chlorobenzothiazolyl, 4,6-dimethyl-5,7-dichlorobenzothiazolyl, 4-ethylthiazolyl, 4,5-dimethylthiazolyl, 4-methylthiazolyl, 4,5-diethylthiazolyl, 4-methyl-5-acetylthiazolyl, 4-methyl-5-carbomethoxythiazolyl, 4 - methyl-5-carboethoxythiazolyl, 4-methyl-5-carbamylthiazolyl and 4-carboethoxythiazolyl.

Examples of products available from the new process include but are not limited to the following:

N-isopropyl-2-benzothiazolesulfenamide
N-isopropyl-2-(5-chlorobenzothiazole)sulfenamide
N-isopropyl-2-(4-methylbenzothiazole)sulfenamide
N-isopropyl-2-(6-ethoxybenzothiazole)sulfenamide
N-isopropyl-2-(4-phenylbenzothiazole)sulfenamide
N-isopropyl-2-(6-nitrobenzothiazole)sulfenamide
N-cyclohexyl-2-benzothiazolesulfenamide
N-(2-allylcyclohexyl)-2-benzothiazolesulfenamide
N-cyclopentyl-2-benzothiazolesulfenamide
N-(2-butyl)-2-benzothiazolesulfenamide
N-benzyl-2-benzothiazolesulfenamide
N-benzyl-2-(5-chlorobenzothiazole)sulfenamide
N-benzyl-2-(4-methylbenzothiazole)sulfenamide
N-benzyl-2-(6-ethoxybenzothiazole)sulfenamide
N-benzyl-2-(4-phenylbenzothiazole)sulfenamide
N-benzyl-2-(6-nitrobenzothiazole)sulfenamide
N-ortho-nitrobenzyl-2-benzothiazolesulfenamide
N-meta-nitrobenzyl-2-benzothiazolesulfenamide
N-para-nitrobenzyl-2-benzothiazolesulfenamide
N-para-methoxybenzyl-2-benzothiazolesulfenamide
N-(4-ethoxy-3-methoxybenzyl)-2-benzothiazolesulfenamide
N-(2,3-dimethoxybenzyl)-2-benzothiazolesulfenamide
N-[5-(1,3-benzodioxolyl)methyl]-2-benzothiazolesulfenamide
N-(3,4-dimethoxybenzyl)-2-benzothiazolesulfenamide
N-cinnamyl-2-benzothiazolesulfenamide
N-butyl-2-benzothiazolesulfenamide
N-ethyl-2-benzothiazolesulfenamide
N-isobutyl-2-benzothiazolesulfenamide
N-ortho-chlorobenzyl-2-benzothiazolesulfenamide
N-para-chlorobenzyl-2-benzothiazolesulfenamide
N-(3,4-dichlorobenzyl)-2-benzothiazolesulfenamide
N-(2,4-dichlorobenzyl)-2-benzothiazolesulfenamide The following detailed examples illustrate the principles of the invention. Preparation of the intermediates is described in co-pending application Serial No. 709,202, filed January 16, 1958, now U.S. Patent No. 2,959,573, of which this application is a continuation-in-part, and co-pending application Serial No. 7,125, filed February 8, 1960, now Patent No. 2,986,554.

*Example 1*

To a stirred slurry comprising 17 grams (0.05 mole) of N-(3,4-dichlorobenzylidene) - 2-benzothiazolesulfenamide and 200 ml. of ethyl alcohol was added dropwise at 65–70° C. 1.9 grams (0.05 mole) of sodium borohydride dissolved in 100 ml. of ethyl alcohol, and the stirred reaction mixture heated at 75–78° C. for one hour. After cooling to 25° C., and adding 600 grams of ice-water, the reaction mixture was stirred at 0–10° C. for an hour. The precipitate was collected by filtration, washed with water until neutral to litmus and air-dried at 25–30° C. N-3,4 - dichlorobenzyl-2-benzothiazolesulfenamide was obtained in 76.2% yield as a cream solid melting at 133–134° C. Analysis gave 8.1% nitrogen, 18.8% sulfur and 20.8% chlorine as compared to 8.2% nitrogen, 18.8% sulfur and 20.8% chlorine calculated for $C_{14}H_{10}Cl_2N_2S_2$.

*Example 2*

To a stirred slurry comprising 61 grams (0.2 mole) of N-ortho-chlorobenzylidene-2 - benzothiazolesulfenamide and 300 ml. of ethyl alcohol was added dropwise at 65–70° C. 7.6 grams (0.2 mole) of sodium borohydride dissolved in 400 ml. of ethyl alcohol, and the stirred reaction mixture heated at 75–78° C. for one hour. After cooling to 25° C. and adding 1500 grams of ice-water, the reaction mixture was stirred at 0–10° C. for an hour. The precipitate was collected by filtration, washed with water until neutral to litmus and air-dried at 25–30° C. N-(o-chlorobenzyl)-2-benzothiazolesulfenamide was obtained in 85% yield as a cream solid melting at 62–63° C. after recrystallization from benzene. Analysis gave 9.1% nitrogen, the calculated value for $C_{14}H_{11}ClN_2S_2$.

*Example 3*

To a stirred slurry comprising 50 grams (0.159 mole) of N-[5-(1,3 - benzodioxolyl)methylene] - 2-benzothiazolesulfenamide and 300 ml. of ethyl alcohol was added dropwise at 65–70° C. 6 grams (0.159 mole) of sodium borohydride dissolved in 300 ml. of ethyl alcohol, and the stirred reaction mixture heated at 75–78° C. for one hour. After cooling to 25° C., and adding 1000 grams of ice-water, the reaction mixture was stirred at 0–10° C. for an hour. The precipitate was collected by filtration, washed with water until neutral to litmus and air-dried at 25–30° C. N - [5-(1,3 - benzodioxolyl)-methyl]-2-benzothiazolesulfenamide was obtained in 89.5% yield as a cream solid melting at 77–78° C. after recrystallization from ethyl alcohol. Analysis gave 8.8% nitrogen and 20.2% sulfur as compared to 8.9% nitrogen and 20.3% sulfur calculated for $C_{15}H_{12}N_2O_2S_2$.

*Example 4*

To a slurry comprising 44.5 grams (0.2 mole) of N-isopropylidene-2-benzothiazolesulfenamide and 400 ml. of ethyl alcohol was added dropwise at 70–72° C. 15.2 grams (0.4 mole) of sodium borohydride dissolved in 400 ml. of ethyl alcohol. The resulting solution was stirred and heated at refluxing temperature (75–78° C.) for one hour and then cooled to 20° C. To this stirred solution was added dropwise 800 ml. of water and stirring continued at 0–10° for one hour. The precipitate was filtered, washed with water until neutral to litmus and air dried at 25–30° C. N-isopropyl-2-benzothiazolesulfenamide was obtained in 87% yield as a white solid, melting at 94–95° C. A mixed melting point with an authentic sample gave no depression. Analysis gave 12.3% nitrogen and 28.6% sulfur as compared to 12.5% nitrogen and 28.6% sulfur calculated for $C_{10}H_{12}N_2S_2$.

The general procedure described above was used in Examples 5–11.

*Example 5*

N - benzyl - 2 - benzothiazolesulfenamide was obtained from N - benzylidene - 2 - benzothiazolesulfenamide in 90.5% yield as a cream solid melting at 119–120° C. Analysis gave 10.2% nitrogen and 23.7% sulfur as compared to 10.3% nitrogen and 23.5% sulfur calculated for $C_{14}H_{12}N_2S_2$.

*Example 6*

N-(p-chlorobenzyl) - 2 - benzothiazolesulfenamide was obtained from N-(p-chlorobenzylidene) - 2 - benzothiazolesulfenamide in 79.4% yield as a cream solid melting at 114–115° C. after recrystallization from ethyl alcohol. Analysis gave 9.1% nitrogen, the calculated value for $C_{14}H_{11}ClN_2S_2$.

*Example 7*

N-(2,4 - dichlorobenzyl)-2 - benzothiazolesulfenamide was obtained from N-(2,4-dichlorobenzylidene)-2-benzothiazolesulfenamide in 82% yield as a cream solid melting at 80–82° C. after recrystallization from benzene. Analysis gave 8.3% nitrogen, 18.9% sulfur and 20.1% chlorine as compared to 8.2% nitrogen, 18.8% sulfur and 20.8% chlorine calculated for $C_{14}H_{10}Cl_2N_2S_2$.

*Example 8*

N-(m-nitrobenzyl) - 2 - benzothiazolesulfenamide was obtained from N-(m-nitrobenzylidene)-2-benzothiazolesulfenamide in 96% yield as a tan colored solid melting at 86–88° C. Analysis gave 13.2% nitrogen, the calculated value for $C_{14}H_{11}N_3O_2S_2$.

*Example 9*

N-(3,4-dimethoxybenzyl)-2 - benzothiazolesulfenamide was obtained from N-(3,4 - dimethoxybenzylidene) - 2- benzothiazolesulfenamide in 82% yield as a cream solid melting at 126–127° C. after recrystallization from alcohol. Analysis gave 8.3% nitrogen as compared to 8.4% calculated for $C_{16}H_{16}N_2O_2S_2$.

*Example 10*

N-(2,3 - dimethoxybenzyl)-2-benzothiazolesulfenamide was obtained from N-(2,3-dimethoxybenzylidene)-2-benzothiazolesulfenamide in 93.1% yield as a cream solid melting at 129–130° C. after recrystallization from ethyl alcohol. Analysis gave 8.4% nitrogen and 19.5% sulfur as compared to 8.4% nitrogen and 19.3% sulfur calculated for $C_{16}H_{16}N_2O_2S_2$.

*Example 11*

N-(4 - ethoxy-3-methoxybenzyl)-2-benzothiazolesulfenamide was obtained from N-(4-ethoxy-3-methoxybenzylidene)-2-benzothiazolesulfenamide in 83.7% yield as a cream solid melting at 80–82° C. after recrystallization from ethyl alcohol. Analysis gave 7.9% nitrogen and 19.0% sulfur as compared to 8.1% nitrogen and 18.5% sulfur calculated for $C_{17}H_{18}N_2O_2S_2$.

*Example 12*

A slurry comprising 200 grams (1.096 moles) of 2-benzothiazolesulfenamide, 196.4 grams (2.0 moles) of cyclohexanone and 200 ml. of ethyl alcohol containing 60 ml. of 2 N sodium hydroxide was heated with stirring from 22° C. to 70° C. over a 20 minute period and then maintained at 70–72° C. for 30 minutes. The resulting solution was cooled to 5° C. and 200 ml. of cold heptane added. After stirring at 0–5° C. for 15 minutes, the solid was collected by filtration, washed with 200 ml. of heptane and air-dried at 25–30° C. The intermediate N-cyclohexylidene-2-benzothiazolesulfenamide was obtained as a cream solid melting at 106–107° C. after recrystallization from ethyl alcohol. Analysis gave 10.7% nitrogen and 24.4% sulfur, the calculated values for $C_{13}H_{14}N_2S_2$.

To a stirred solution comprising 26.2 grams (0.1 mole) of the above N-cyclohexylidene-2-benzothiazolesulfenamide in 200 ml. of ethyl alcohol was added dropwise at 65–70° C. in thirty minutes, 3.8 grams (0.1 mole) of sodium borohydride dissolved in 200 ml. of ethyl alcohol and the solution held at refluxing temperature for one hour. After cooling to 25° C., 1000 grams of ice-water were added and the solution stirred for an additional hour. The precipitate was collected by filtration, washed with water until neutral to litmus and air-dried at 25–30° C. After recrystallization from ethyl alcohol the N-cyclohexyl-2-benzothiazolesulfenamide melted at 102–103° C. The melting point of an admixture with an authentic sample of N-cyclohexyl-2-benzothiazolesulfenamide was 102–103° C. showing the two compounds to be identical. The yield was 99% of a product analyzing 10.7% nitrogen and 24.2% sulfur as compared to 10.6% nitrogen and 24.3% sulfur calculated for $C_{13}H_{16}N_2S_2$. N-cyclohexylidene-2-benzothiazolesulfenamide should be used promptly because it undergoes transformation upon standing in the presence of hydroxyl ion to 2-(2-benzothiazolylthio)cyclohexanone.

*Example 13*

To a stirred slurry comprising 37 grams (0.149 mole) of N-cyclopentylidene-2-benzothiazolesulfenamide and 200 ml. of ethyl alcohol was added dropwise at 65–70° C. 5.7 grams (0.149 mole) of sodium borohydride dissolved in 300 ml. of ethyl alcohol, and the stirred reaction mixture heated at 70–75° C. for one hour. After cooling to 25° C., and adding 1500 grams of ice-water, the reaction mixture was stirred at 0–10° C. for an hour. The precipitate was collected by filtration, washed with water until neutral to litmus and air-dried at 25–30° C. N-cyclopentyl-2-benzothiazolesulfenamide was obtained in 87.6% yield as a tan solid analyzing 10.8% nitrogen and 25.9% sulfur as compared to 11.2% nitrogen and 25.6% sulfur calculated for $C_{12}H_{14}N_2S_2$. It was identical with a product prepared as follows:

To a stirred solution containing 33.6 parts (0.2 mole) of 97% 2-mercaptobenzothiazole, 60 ml. of water and 32 parts (0.2 mole) of 25% sodium hydroxide was added dropwise 68 grams (0.8 mole) of cyclopentylamine. After stirring for a period of 15 minutes, 33.6 ml. of 25% sulfuric acid solution was added dropwise over a period of 15 minutes and stirring continued for another 15 minutes. Then 140 ml. (0.24 mole) of an aqueous solution of sodium hypochlorite (12.7 grams per 100 ml.) was added dropwise at 30–35° C. over a period of one and one-half hours. The stirred reaction mixture was maintained at these temperatures for an additional time and then 2 grams of sodium sulfite was added to destroy excess oxidizing agent. After cooling to 5° C., 200 ml. of water and 300 ml. of ether were added and stirring continued for a period of 15 minutes. The ether solution was separated, washed successively with 200 ml. of 2% acetic acid and finally with water until the wash water was neutral to litmus. The ether solution was dried over sodium sulfate and the ether removed in vacuo at a maximum temperature of 30° C. The N-cyclopentyl-2-benzothiazolesulfenamide was a tan solid melting at 67–69° C., after recrystallization from methanol and water.

It is intended to cover all changes and modifications of the examples of the invention herein chosen for purposes of disclosure which do not constitute departure from the spirit and scope of the invention.

What is claimed is:

1. The method of preparing thiazolesulfenamides which comprises reducing with sodium borohydride the external nitrogen-carbon double bond in a compound of the formula

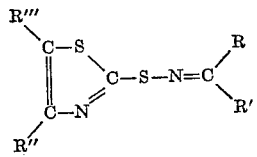

where R is selected from the group consisting of lower alkyl and hydrogen and R' is selected from the group consisting of alkyl, alkylene, cycloalkyl containing at least 5 but not more than 6 ring carbon atoms, halogen substituted alkenyl, halogen substituted alkyl, phenyl, halogen substituted phenyl, halogen substituted hydroxy phenyl, nitro substituted phenyl, phenyl substituted alkenyl, furyl, thienyl, lower alkoxy substituted phenyl and radicals which with R and C form cycloalkylidene containing at least 5 but not more than 6 ring carbon atoms, R'' is selected from the group consisting of hydrogen, lower alkyl and lower carboalkoxy, R''' is selected from the group consisting of hydrogen, lower alkyl, acetyl, lower carboalkoxy and carbamyl, and R'' and R''' taken together with the vicinal carbon atoms of the thiazole ring constitute a closed ring selected from the group consisting of benzene
naphthalene
tetrahydrobenzene
6,7-dihydro-4,5-benzobenzene
monoloweralkylbenzene
monoloweralkylmonochlorobenzene
monochlorobenzene
monophenylbenzene
diloweralkylbenzene
monoloweralkoxybenzene
monoloweralkoxymonochlorobenzene
diloweralkylmonochlorobenzene
diloweralkyldichlorobenzene
and mononitrobenzene 2. The method of preparing thiazolesulfenamides which comprises reducing with sodium borohydride the external nitrogen-carbon double bond in a compound of the formula

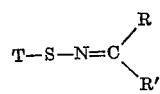

where T represents 2-benzothiazolyl, R represents lower alkyl and R' represents lower alkenyl.

3. The method of preparing thiazolesulfenamides which comprises reducing with sodium borohydride the external nitrogen-carbon double bond in a compound of the formula

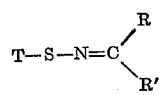

where T represents 2-benzothiazolyl and R and R' represent lower alkyl groups.

4. The method of preparing thiazolesulfenamides which comprises reducing with sodium borohydride the external nitrogen-carbon double bond in a compound of the formula

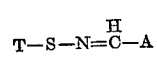

where T represents 2-benzothiazolyl and A represents an alicyclic radical containing 6 ring carbon atoms.

5. The method of preparing thiazolesulfenamides which comprises reducing with sodium borohydride the external nitrogencarbon double bond in a compound of the formula

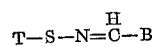

where T represents 2-benzothiazolyl and B represents an aryl radical of the benzene series containing 6 carbon atoms.

6. The method of preparing thiazolesulfenamides which comprises reducing with sodium borohydride the external nitrogen-carbon double bond in a compound of the formula

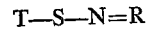

where T represents 2-benzothiazolyl and R represents a cycloalkylidene radical containing at least five but not more than six ring carbon atoms.

7. The method of preparing N-isopropyl-2-benzothiazolesulfenamide which comprises reducing with sodium borohydride the external nitrogen-carbon double bond in N-isopropylidene-2-benzothiazolesulfenamide.

8. The method of preparing N-cyclohexyl-2-benzothiazolesulfenamide which comprises reducing with sodium borohydride the external nitrogen-carbon double bond in N-cyclohexylidene-2-benzothiazolesulfenamide.

9. The method of preparing N-cyclopentyl-2-benzothiazolesulfenamide which comprises reducing with sodium borohydride the external nitrogen-carbon double bond in N-cyclopentylidene-2-benzothiazolesulfenamide.

10. The method of preparing N-benzyl-2-benzothiazolesulfenamide which comprises reducing with sodium borohydride the external nitrogen-carbon double bond in N-benzylidene-2-benzothiazolesulfenamide.

References Cited in the file of this patent
OTHER REFERENCES

Gaylord: "Reduction With Complex Metal Hydrides," pages 796, 829 (1956).

Billman et al.: J. Org. Chem., volume 22, pages 1068–70 (1957).